United States Patent
Smith

(10) Patent No.: US 10,830,245 B2
(45) Date of Patent: Nov. 10, 2020

(54) SOFTWARE-BASED DETECTION OF THRUST BEARING FAILURES FOR USE WITH A MOTOR DRIVEN COMPRESSOR

(71) Applicant: Hamilton Sundstrand Corporation, Charlotte, NC (US)

(72) Inventor: Darren Smith, Bothell, WA (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 214 days.

(21) Appl. No.: 15/682,732

(22) Filed: Aug. 22, 2017

(65) Prior Publication Data

US 2018/0363666 A1 Dec. 20, 2018

Related U.S. Application Data

(60) Provisional application No. 62/521,738, filed on Jun. 19, 2017.

(51) Int. Cl.
*F04D 27/00* (2006.01)
*F04D 27/02* (2006.01)
*F04D 29/041* (2006.01)

(52) U.S. Cl.
CPC ....... *F04D 27/001* (2013.01); *F04D 27/0261* (2013.01); *F04D 27/0292* (2013.01); *F04D 29/0413* (2013.01)

(58) Field of Classification Search
CPC .............. F04D 27/001; F04D 27/0261; F04D 27/0292; F04D 29/0413
USPC .......................................................... 415/16
See application file for complete search history.

(56) References Cited

U.S. PATENT DOCUMENTS

| | | | |
|---|---|---|---|
| 4,167,734 A | 9/1979 | Logan et al. | |
| 5,125,067 A * | 6/1992 | Erdman | F23N 3/082 |
| | | | 318/400.2 |
| 5,898,388 A | 4/1999 | Hofmann et al. | |
| 6,161,962 A | 12/2000 | French et al. | |
| 6,407,475 B1 | 6/2002 | Care | |
| 7,151,349 B1 * | 12/2006 | Williamson | H02P 6/08 |
| | | | 318/400.37 |
| 8,079,227 B2 | 12/2011 | Crane | |
| 2005/0029976 A1 | 2/2005 | Terry et al. | |
| 2016/0061207 A1 * | 3/2016 | Penn, II | F04B 35/04 |
| | | | 417/44.1 |

FOREIGN PATENT DOCUMENTS

| | | |
|---|---|---|
| EP | 2412983 A2 | 2/2012 |
| WO | 2016033481 A1 | 3/2016 |

OTHER PUBLICATIONS

Search Report dated Oct. 18, 2018, EP Application No. EP18178630, 8 pages.

* cited by examiner

*Primary Examiner* — Joseph J Dallo
*Assistant Examiner* — Scott A Reinbold
(74) *Attorney, Agent, or Firm* — Cantor Colburn LLP

(57) ABSTRACT

A system for controlling a motor driven compressor (MDC) is provided. The system includes a sensing element and a controller coupled to the sensing element. The controller is configured to determine whether an actual speed of the MDC sensed by the sensing element is below a predicted minimum speed, shut down and then restart the MDC and detect if the restart of the MDC is successful.

20 Claims, 5 Drawing Sheets

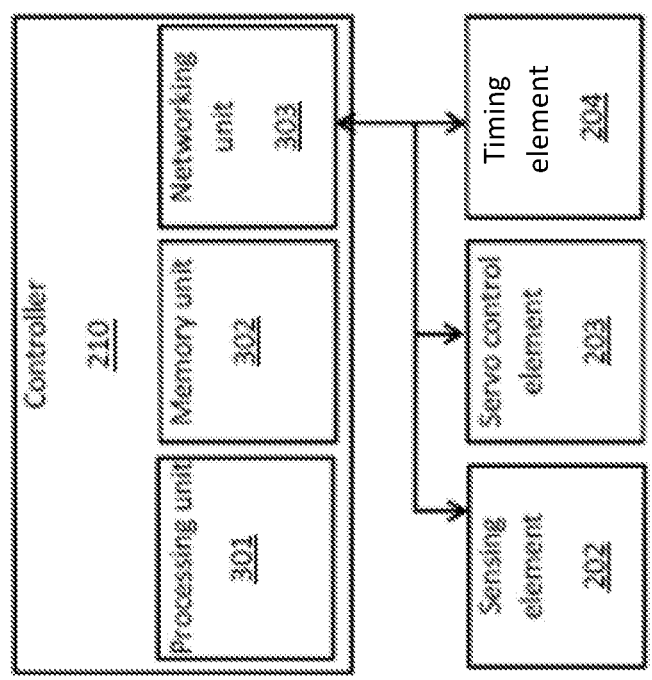

SOFTWARE-BASED DETECTION OF THRUST BEARING FAILURES FOR USE WITH A MOTOR DRIVEN COMPRESSOR

CROSS-REFERENCE TO RELATED APPLICATION

This Application claims benefit of priority to U.S. Provisional Application No. 62/521,738 filed Jun. 19, 2017, the disclosure of which is incorporated herein by reference in its entirety.

BACKGROUND

The following description relates to thrust bearings and, more specifically, to software-based detection of thrust bearing failures.

A motor driven compressor (MDC) can experience a thrust bearing failure mode. If left undetected, such a failure mode can result in moving surfaces impinging upon one another such that their surface temperatures increase. In some cases, these increases can lead to surface temperatures exceeding a predefined limit (e.g., a predefined limit of 450° F. in accordance with relevant requirements).

The issue of failure detection is often addressed in conventional MDCs through the presence of surface mounted thermal switches. The surface mounted thermal switches operate by detecting failures and causing a shutdown of the MDC. While such devices can be useful, inspections and field return units have shown that the surface mounted thermal switches can shift in position and cease to be fully operational.

BRIEF DESCRIPTION

According to an aspect of the disclosure, a system for controlling a motor driven compressor (MDC) is provided. The system includes a sensing element and a controller coupled to the sensing element. The controller is configured to determine whether an actual speed of the MDC sensed by the sensing element is below a predicted minimum speed, shut down and then restart the MDC and detect if the restart of the MDC is successful.

In accordance with additional or alternative embodiments, the actual and predicted minimum speeds are rotational speeds of a rotating element of the MDC.

In accordance with additional or alternative embodiments, he controller is configured to determine whether the actual speed of the MDC is below the predicted minimum speed for a first period of time and the controller is configured to restart the MDC following the shut down after a second period of time which is longer than the first period of time.

In accordance with additional or alternative embodiments, the controller is configured to detect that the restart is successful from detection of an MDC underspeed condition.

In accordance with additional or alternative embodiments, the controller is configured to cease the determining and the shutting down and then the restarting following a predefined number of consecutive restarts.

In accordance with additional or alternative embodiments, the predefined number of the consecutive restarts is reset in response to a conditional change.

In accordance with additional or alternative embodiments, the controller is configured to track a number of successful restarts.

According to another aspect of the disclosure, a system for controlling a motor driven compressor (MDC) is provided and includes a sensing element, a servo control element, a timing element and a controller coupled to the sensing element, the servo control element and the timing element. The controller is configured to determine whether readings of the sensing element are indicative of an actual speed of the MDC falling below a predicted minimum speed for a first period of time as timed by the timing element, cause the servo control element to shut down the MDC for a second period of time as timed by the timing element following an end of the first period of time, restart the MDC following an end of the second period of time and detect if the restart of the MDC is successful.

In accordance with additional or alternative embodiments, the actual and predicted minimum speeds are rotational speeds of a rotating element of the MDC.

In accordance with additional or alternative embodiments, the first period of time is shorter than the second period of time.

In accordance with additional or alternative embodiments, a common mode starter controller (CMSC) is configured to detect an MDC underspeed by which the controller detects if the restart of the MDC is successful.

In accordance with additional or alternative embodiments, the controller is configured to cease the determining, the causing and the restarting following a predefined number of consecutive restarts.

In accordance with additional or alternative embodiments, the predefined number of the consecutive restarts is reset in response to a conditional change.

In accordance with additional or alternative embodiments, the controller is configured to track a number of successful restarts.

According to yet another aspect of the disclosure, a method of controlling a motor driven compressor (MDC) is provided. The method includes determining whether an actual speed of the MDC falls below a predicted minimum speed for a first period of time, causing the servo control element to shut down the MDC for a second period of time following an end of the first period of time in an event the actual speed of the MDC is below the predicted minimum speed for the first period of time, restarting the MDC following an end of the second period of time and detecting if the restart of the MDC is successful.

In accordance with additional or alternative embodiments, the actual and predicted minimum speeds are rotational speeds of a rotating element of the MDC.

In accordance with additional or alternative embodiments, the first period of time is shorter than the second period of time.

In accordance with additional or alternative embodiments, the detecting includes detecting an MDC underspeed condition.

In accordance with additional or alternative embodiments, the determining, the causing and the restarting cease following a predefined number of consecutive restarts, the method further comprising resetting the number of the consecutive restarts in response to a conditional change.

In accordance with additional or alternative embodiments, the method further includes tracking a number of successful restarts.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 3 is a schematic diagram of a controller of the system of FIG. 2 in accordance with embodiments;

These and other advantages and features will become more apparent from the following description taken in conjunction with the drawings.

DETAILED DESCRIPTION

As will be described below, thrust bearing failure modes are detected and acted upon by a system that will not shift in position over time and thus will not cease to be fully operational over time. The system involves the use of software-based detection of thrust bearing failures for use with a motor driven compressor (MDC) or another similar device.

Figure 1:
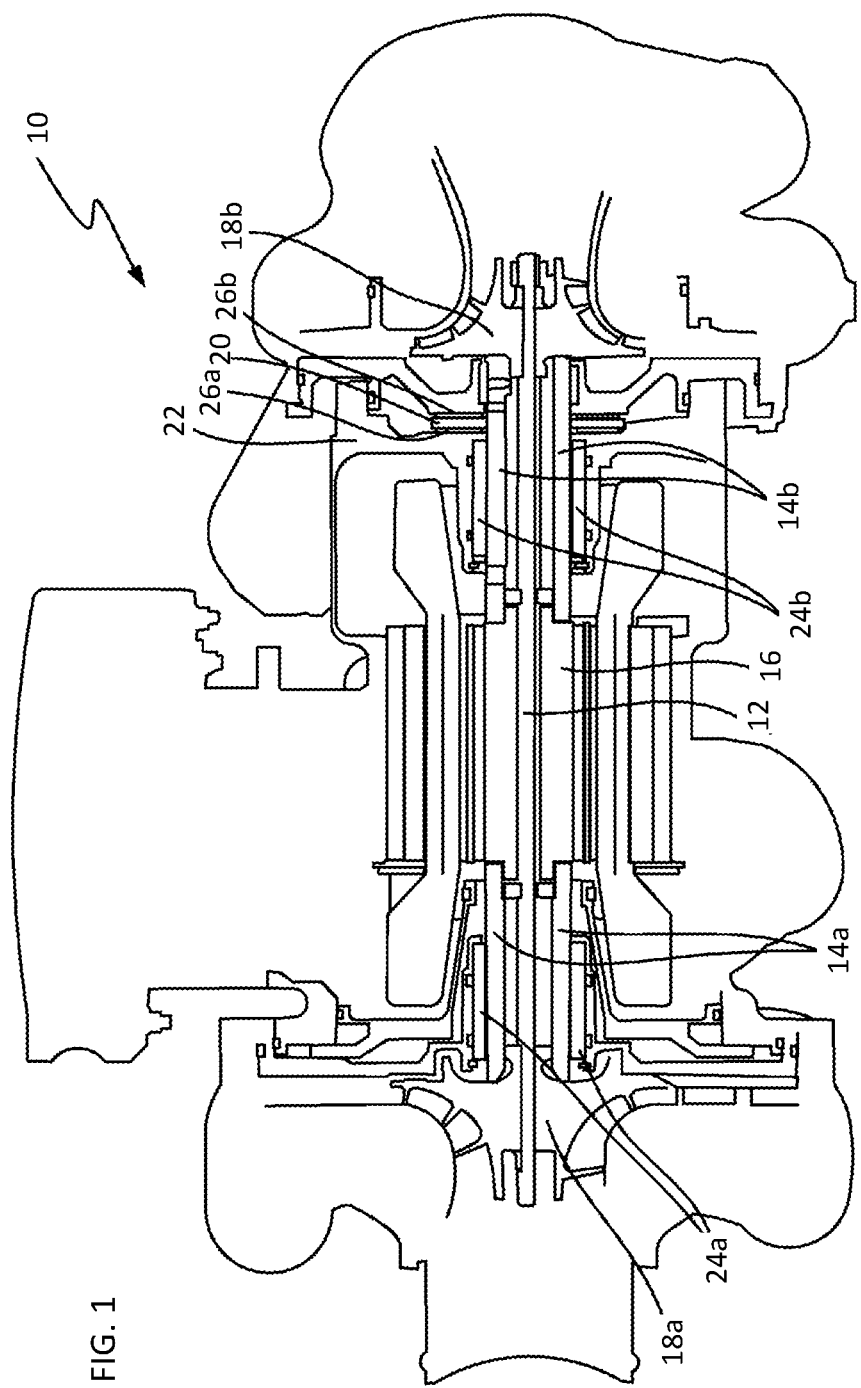
FIG. 1 is a schematic diagram of a motor driven compressor (MDC) in accordance with embodiments

FIG. 1 is a schematic diagram of MDC 10 in accordance with embodiments. The MDC 10 includes tie rod 12, motor shafts 14a and 14b, stator winding 16, rotor compressor stages 18a and 18b, thrust runner 20, housing 22, journal bearings 24a and 24b and thrust bearings 26a and 26b. In some cases, the stator winding 16 drives compressor stages 18a and 18b and, in other cases, rotating components may be driven by any rotating machine, such as a turbine. The motor shafts 14a and 14b rotate on the journal bearings 24a and 24b. The thrust runner 20 is utilized to prevent axial movement of the rotating components of the MDC 10. The thrust bearings 26a and 26b prevent contact between the thrust runner 20 and the housing 22. Failure modes can occur, for example, due to failures of any of the journal bearings 24a and 24b and the thrust bearings 26a and 26b. When a failure occurs at thrust bearing 26b, for example, heat is generated due to contact between the thrust runner 20 and the housing 22. This heat is conducted to the surface of the housing 22 and can lead to above-normal temperatures relative to normal operating temperatures.

Figure 2:
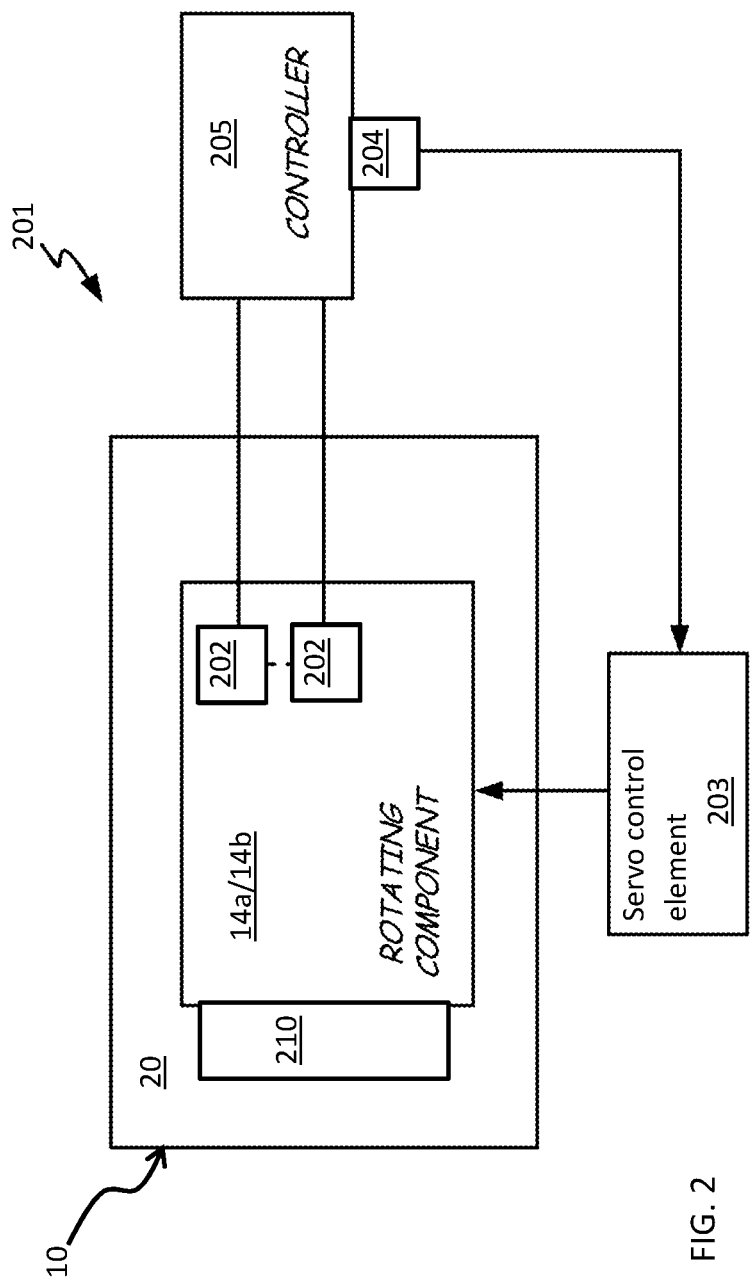
FIG. 2 is a block diagram illustrating a system for monitoring a rotating component of the MDC of FIG. 1 in accordance with embodiments.

With reference to FIG. 2, a system 201 is provided for monitoring and controlling an MDC, such as the MDC 10 of FIG. 1. The system 201 includes one or more sensors or sensing elements 202, a servo or servo control element 203, a timing element 204 and a controller 205. The one or more sensing elements 202 may be disposable on at least one of the rotating components of the MDC 10, such as the motor shafts 14a and 14b, and at least one of the stationary components of the MDC 10, such as the housing 22. In either case, the one or more sensing elements 202 may be disposed and configured to sense an operational parameter of the MDC 10 and, in accordance with embodiments, this operational parameter may include a rotational speed of the rotational components of the MDC 10 relative to the stationary components of the MDC 10 (e.g., a rotational speed in revolutions per minute (RPM) of the motor shafts 14a and 14b relative to the housing 22). The servo control element 203 is operably coupled with the MDC 10 and configured to start up, shut down and restart the MDC 10 in accordance with commands or instructions received by the servo control element 203. The timing element 204 may be provided as a component of the controller 205 or as a standalone component. In either case, the timing element 204 is configured to time certain events related to the monitoring and controlling of the MDC 10 as will be described below. The controller 205 is coupled to the one or more sensing elements 202, the servo control element 203 and the timing element 204

In accordance with embodiments, the system 201 may further include a common mode start controller (CMSC) 210. In such cases, the CMSC 210 may be configured to detect an underspeed condition of the MDC 10 by which the controller 205 would be able to detect if a restart of the MDC 10 is or is not successful as will be described below.

With continued reference to FIG. 2 and with additional reference to FIG. 3, the controller 205 includes a processing unit 301, a memory unit 302 and a networking unit 303 by which the processing unit 301 is communicative with the one or more sensing elements 202, the servo control element 203 and the timing element 204. The processing unit 301 may be provided as a central processing unit (CPU) and is coupled with the memory unit 302 and the networking unit 303. The memory unit 302 has executable instructions stored thereon, which, when executed, cause the processing unit 301 to operate as described herein.

For example, when executed, the executable instructions cause the processing unit 301 to either calculate a predicted minimum speed of the MDC 10 based on current conditions or to access data reflective of the predicted minimum speed in the memory unit 302, to receive signals from the one or more sensing elements 202 which are reflective of and derived from readings of an actual speed of the MDC 10 that are generated by the one or more sensing elements 202 and to determine from those signals whether the readings of the one or more sensing elements 202 are indicative of the actual speed of the MDC 10 falling below the predicted minimum speed (again, the predicted minimum and actual speeds of the MDC are, for example, rotational speeds of a rotating component thereof relative to a stationary component thereof).

In addition, in an event that is can be determined that the actual speed of the MDC 10 falls or has fallen below the predicted minimum speed, the executable instructions further cause the processing unit 301 to determine whether the actual speed of the MDC 10 falls or has fallen below the predicted minimum speed for a first period of time as timed by the timing element 204. In an event it can be determined that the actual speed of the MDC 10 falls or has fallen below the predicted minimum speed for the first period of time, the executable instructions cause the processing unit 301 to in turn cause the servo control element 203 to shut down the MDC 10 for a second period of time as timed by the timing element 204 following an end of the first period of time and to attempt to restart the MDC 10 following an end of the second period of time. Following the attempted restart, the executable instructions also cause the processing unit 301 to determine whether the attempted restart was or was not successful.

In accordance with embodiments, the first period of time may be shorter than the second period of time. In accordance with further embodiments, the first period of time may be about 10 seconds and the second period of time may be about 60 seconds. In accordance with still further embodiments, the determination of whether the attempted restart was or was not successful may be accomplished by the CMSC 210 being configured to directly sense whether the restart was or was not successful based on the CMSC 210 identifying that an incidence of the MDC 10 exhibiting or experiencing an underspeed condition is in effect and by the processing unit 301 communicating with the CMSC 210 to be receptive of a corresponding indication from the CMSC 210 of whether the restart was or was not successful.

In accordance with further embodiments, the executable instructions of the memory unit 302 may, when executed, cause the processing unit 301 to maintain a count of consecutive restarts of the MDC 10 and to cease the determining, the causing and the restarting following a predefined number of consecutive restarts (which may be stored in the memory unit 302), to reset the predefined number of the consecutive restarts in response to a conditional change, such as a flight mission phase change, and to track and store in the memory unit 302 a total number of consecutive and non-consecutive successful restarts for the generation of a report.

Figure 4:
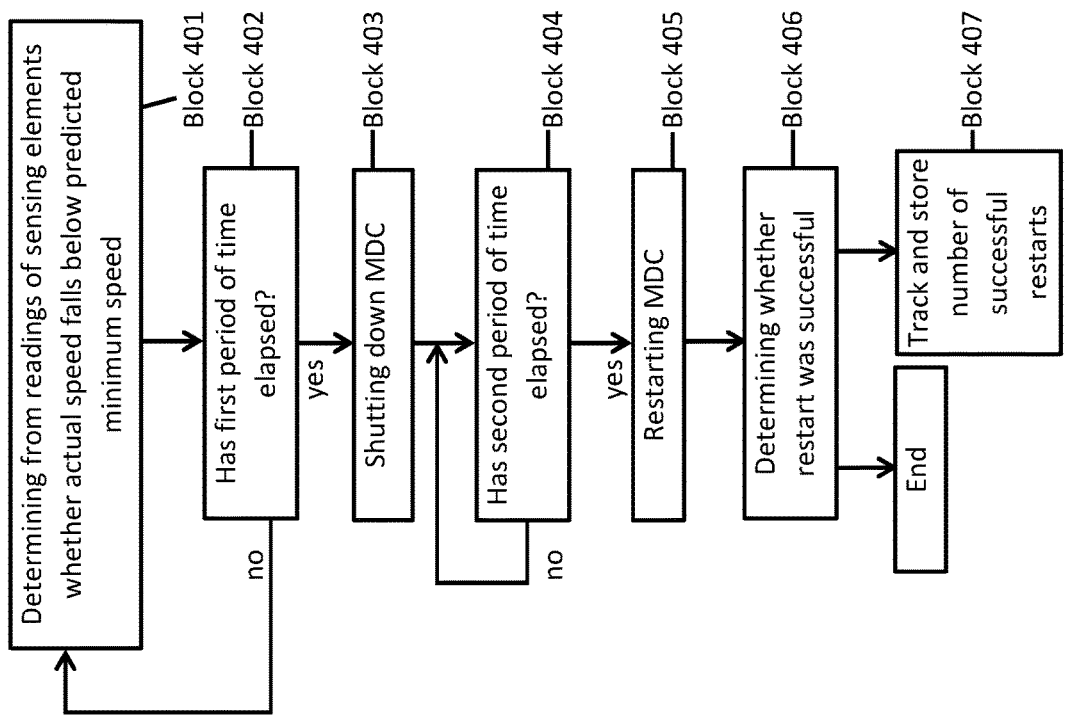
FIG. 4 is a flow diagram illustrating a method of controlling an MDC in accordance with embodiments.

With reference to FIG. 4, a method of controlling an MDC, such as the MDC 10 of FIG. 1 is provided and may be executed, for example, by the system 201 and the controller 205 of FIGS. 2 and 3. As shown in FIG. 4, the method includes determining from readings of the one or more sensing elements 202 whether an actual (rotational or other) speed of the MDC 10 falls below a predicted minimum (rotational or other) speed (block 401) and, if so, determining whether a first period of time as timed by the timing element 204 has elapsed (block 402).

In an event the actual speed of the MDC 10 falls or has fallen below the predicted minimum speed and the first period of time has elapsed, the method further includes causing the servo control element 203 to shut down the MDC 10 (block 403), then waiting for a second period of time as timed by the timing element 204 (block 404) and restarting the MDC 10 following an end of the second period of time (block 405). At this point, the method includes detecting if the restart of the MDC 10 is or is not successful (block 406) and tracking and storing a total number of consecutive or non-consecutive restarts for later use in a generated report (block 407).

As noted above, the first period of time may be shorter than the second period of time and, more particularly, the first period of time may be about 10 seconds and the second period of time may be about 60 seconds.

Figure 5:
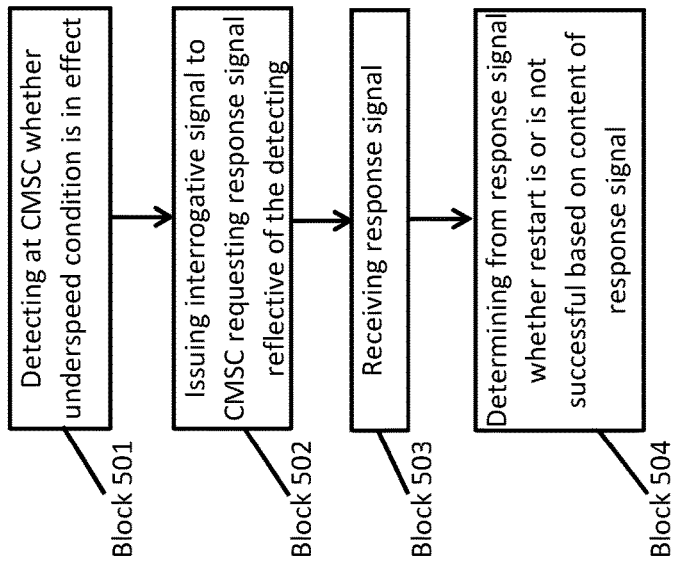
FIG. 5 is a flow diagram illustrating a method of detecting an MDC underspeed condition in accordance with embodiments.

With reference to FIG. 5, a method of executing the detecting of whether the restart of the MDC 10 is or is not successful will now be described. As shown in FIG. 5, the method includes detecting, at the CMSC 210, that an underspeed condition of the MDC 10 is or is not in effect (block 501), issuing an interrogative signal from the processing unit 301 to the CMSC 210 which requests a response signal that is reflective of the detecting (block 502), receiving, at the processing unit 301, the response signal from the CMSC 210 (block 503) and determining, at the processing unit 301, from the response signal whether the restart is or is not successful based on the content of the response signal (block 504).

Figure 6:
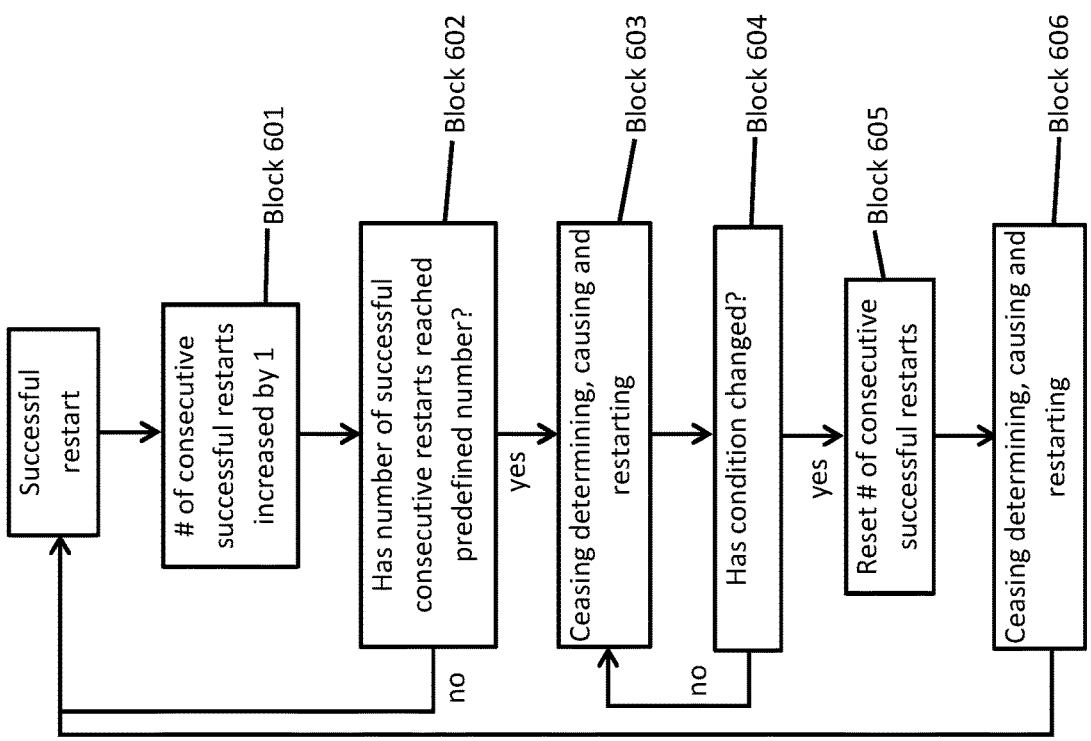
FIG. 6 is a flow diagram illustrating a further method of controlling an MDC in accordance with embodiments.

With reference to FIG. 6, a further method of monitoring and controlling the MDC 10 of FIG. 1 which is executable by the system 201 and the controller 205 of FIGS. 2 and 3 will now be described. As shown in FIG. 6, each successful restart is counted (block 601) and it is determined whether the count has or has not reached a predefined number of consecutive restarts which may, in some cases, be stored in the memory unit 302 (block 602). If the predefined number of consecutive restarts has been reached, the determining, the causing and the restarting are ceased (block 603). Subsequently, the method further includes identifying whether a conditional change, such as a change in a flight mission phase or status, has occurred (block 604) and, if so, resetting the number of the consecutive restarts (block 605) and resuming the determining, the causing and the restarting (block 606).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for controlling a motor driven compressor (MDC) comprising rotating components and stationary components, the system comprising:
   sensors respectively disposed on at least one of the rotating components of the MDC and on at least one of the stationary components of the MDC to sense an actual speed of the MDC;
   a controller coupled to the sensors and configured to:
      determine whether the actual speed of the MDC sensed by the sensors is below a predicted minimum speed of the MDC for a first period of time,
      shut down and then restart the MDC following the shut down after a second period of time which is longer than the first period of time, and
      detect if the restart of the MDC is successful.

2. The system according to claim 1, wherein the actual and predicted minimum speeds of the MDC are rotational speeds of the at least one of the rotating components of the MDC relative to the at least one of the stationary components of the MDC.

3. The system according to claim 1, wherein the first period of time is multiple seconds long and the second period of time is multiple times longer than the first period of time.

4. The system according to claim 1, wherein the controller is configured to detect that the restart is successful from detection of an MDC underspeed condition.

5. The system according to claim 1, wherein the controller is configured to cease the determining and the shutting down and then the restarting following a predefined number of consecutive restarts.

6. The system according to claim 5, wherein the predefined number of the consecutive restarts is reset in response to a conditional change.

7. The system according to claim 1, wherein the controller is configured to track a number of successful restarts.

8. A system for controlling a motor driven compressor (MDC) comprising rotating components and stationary components, the system comprising:
   sensors respectively disposed on at least one of the rotating components of the MDC and on at least one of the stationary components of the MDC to sense an actual speed of the MDC;

a servo operably coupled to the MDC and configured to start up, shut down and restart the MDC; and a controller coupled to the sensors and the servo and configured to:

determine whether readings of the sensors are indicative of an actual speed of the MDC falling below a predicted minimum speed of the MDC for a first period of time, cause the servo to shut down the MDC for a second period of time following an end of the first period of time, restart the MDC following an end of the second period of time which is longer than the first period of time, and detect if the restart of the MDC is successful.

9. The system according to claim 8, wherein the actual and predicted minimum speeds of the MDC are rotational speeds of the at least one of the rotating components of the MDC relative to the at least one of the stationary components of the MDC.

10. The system according to claim 8, wherein the first period of time is multiple seconds long and the second period of time is multiple times longer than the first period of time.

11. The system according to claim 8, further comprising a common mode starter controller (CMSC) configured to detect an MDC underspeed by which the controller detects if the restart of the MDC is successful.

12. The system according to claim 8, wherein the controller is configured to cease the determining, the causing and the restarting following a predefined number of consecutive restarts.

13. The system according to claim 12, wherein the predefined number of the consecutive restarts is reset in response to a conditional change.

14. The system according to claim 8, wherein the controller is configured to track a number of successful restarts.

15. A method of controlling a motor driven compressor (MDC) to which a servo is operably coupled, the servo being configured to start up, shut down and restart the MDC, the method comprising:

sensing an actual speed of the MDC using sensors respectively disposed on at least one rotating component of the MDC and on at least one stationary component of the MDC;

determining whether the actual speed of the MDC falls below a predicted minimum speed of the MDC for a first period of time;

causing the servo to shut down the MDC for a second period of time following an end of the first period of time in an event the actual speed of the MDC is below the predicted minimum speed for the first period of time;

restarting the MDC following an end of the second period of time which is longer than the first period of time; and detecting if the restart of the MDC is successful.

16. The method according to claim 15, wherein the actual and predicted minimum speeds of the MDC are rotational speeds of the at least one rotating component of the MDC relative to the at least one stationary component of the MDC.

17. The method according to claim 15, wherein the first period of time is multiple seconds long and the second period of time is multiple times longer than the first period of time.

18. The method according to claim 15, wherein the detecting comprises detecting an MDC underspeed condition.

19. The method according to claim 15, wherein the determining, the causing and the restarting cease following a predefined number of consecutive restarts, the method further comprising resetting the number of the consecutive restarts in response to a conditional change.

20. The method according to claim 15, further comprising tracking a number of successful restarts.

* * * * *